US012715984B2

(12) United States Patent
Pesek et al.

(10) Patent No.: US 12,715,984 B2
(45) Date of Patent: Aug. 25, 2026

(54) COMPOSITIONS AND HIGH INDEX ETHYLENE/ALPHA-OLEFIN INTERPOLYMERS FOR IMPROVED MECHANICAL PROPERTIES

(71) Applicant: Dow Global Technologies LLC, Midland, MI (US)

(72) Inventors: Stacy L. Pesek, Pearland, TX (US); Yushan Hu, Pearland, TX (US); Yi Jin, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 494 days.

(21) Appl. No.: 18/252,284

(22) PCT Filed: Dec. 16, 2021

(86) PCT No.: PCT/US2021/063917
§ 371 (c)(1),
(2) Date: May 9, 2023

(87) PCT Pub. No.: WO2022/133145
PCT Pub. Date: Jun. 23, 2022

(65) Prior Publication Data

US 2023/0407068 A1 Dec. 21, 2023

Related U.S. Application Data

(60) Provisional application No. 63/127,354, filed on Dec. 18, 2020.

(51) Int. Cl.
*C08L 23/0807* (2025.01)

(52) U.S. Cl.
CPC ..... *C08L 23/0815* (2013.01); *C08L 2205/025* (2013.01)

(58) Field of Classification Search
CPC .. C08L 23/08; C08L 23/0807; C08L 23/0815; C08L 2205/025
See application file for complete search history.

(56) References Cited

U.S. PATENT DOCUMENTS

| | | | |
|---|---|---|---|
| 725,473 | A | 4/1903 | O'Donnell |
| 6,610,408 | B1 | 8/2003 | Srinivasan et al. |
| 7,199,180 | B1 | 4/2007 | Simmons et al. |
| 8,389,634 | B2 | 3/2013 | Yalvac et al. |
| 2014/0037876 | A1 | 2/2014 | Esangbedo et al. |
| 2014/0171586 | A1 | 6/2014 | Hu et al. |
| 2021/0030002 | A1 | 2/2021 | Dahmen et al. |

FOREIGN PATENT DOCUMENTS

| | | | | |
|---|---|---|---|---|
| EP | 2392611 | A2 * | 12/2011 | .............. C08F 10/00 |
| WO | 9733921 | | 3/1997 | |
| WO | 2006004750 | | 1/2006 | |
| WO | 2011163176 | A1 | 12/2011 | |
| WO | WO-2017173293 | A1 * | 10/2017 | .......... C08L 23/0815 |
| WO | 2020010052 | | 1/2020 | |
| WO | 2021237306 | | 12/2021 | |

OTHER PUBLICATIONS

PCT/US2021/063917, International Search Report and Written Opinion with a mailing date of Mar. 28, 2022.

* cited by examiner

*Primary Examiner* — Jeffrey S Lenihan

(57) ABSTRACT

A composition comprising at least the following: a first composition comprising components a and b: a) a first ethylene/alpha-olefin interpolymer comprising an I2≤100 dg/min, and a density ≤0.880 g/cc, and b) a second ethylene/alpha-olefin interpolymer comprising an I2>100 dg/min; and wherein the first composition meets the following relationship: $y<1.26\ln(x)-3.90$, where y=weight ratio of the second interpolymer to the first interpolymer, and x=the I2 ratio of the second interpolymer to the first interpolymer; and wherein the composition comprises ≥60 wt % of the sum of the first interpolymer and the second interpolymer, based on the weight of the composition.

17 Claims, 1 Drawing Sheet

COMPOSITIONS AND HIGH INDEX ETHYLENE/ALPHA-OLEFIN INTERPOLYMERS FOR IMPROVED MECHANICAL PROPERTIES

CROSS-REFERENCE TO RELATED APPLICATIONS

The present application claims the benefit of priority to U.S. Provisional Application No. 63/127,354, filed on Dec. 18, 2020, which is incorporated herein by reference in its entirety.

BACKGROUND OF THE INVENTION

Typical olefin-based polymers have a trade-off between mechanical properties and processibility. As the molecular weight of the polymer decreases, the mechanical properties, such Tensile Elongation at Break and Tensile Strength, also decrease. Therefore, to maintain good mechanical properties, polymers of high molecular weights are desired. However, as molecular weights increase, so does the melt viscosity of the polymer, which can be detrimental for the processability of the polymer, such as in high speed polymer injection molding processes. There is a need for polymer compositions that provide excellent mechanical properties and excellent processability.

U.S. Pat. No. 7,199,180 discloses adhesive compositions comprising at least one homogeneous ethylene/alpha-olefin interpolymer. Compositions containing two of such interpolymers of different melt indexes and/or melt viscosities values are disclosed. These compositions typically contain significant amounts of tackifier and/or wax. See, for example, columns 35-53 (Tables 6, 16A, 16B, 18B, 18C).

U.S. Publication 2014/0171586 discloses adhesives comprising olefin copolymers with an average melt index greater than 5, but less than about 35 g/10 minutes at 190° C. (see abstract). These compositions typically contain relatively high amounts (30-70 wt %) of tackifier (see paragraph [0032]).

U.S. Pat. No. 8,389,634 discloses a composition comprising the following: A) from 75 to 99 weight percent, of a thermoplastic polyolefin composition, which consists of the following: (a) from 50 to 83.5 weight percent of, for example, polypropylene. HDPE, or a mixture thereof; and (b) from 16.5 to 50 weight percent of a first ethylene/alpha-olefin interpolymer having a density from 0.870 to less than, or equal to, 0.903 g/cm$^3$; and B) from 1 to 25 weight percent of an extender, consisting of a second ethylene/a-olefin interpolymer, other than component A)(b), and having the following properties: (i) a density of at least 0.855, and less than, or equal to, 0.890 g/cm$^3$ and (ii) a Brookfield Viscosity at 350° F., from 3000 cP to 17,000 cP, and wherein the second ethylene/alpha-olefin interpolymer is a copolymer. See claim 1. The extender is used to reduce the viscosity of the base polymer (polypropylene or HDPE).

International Publication WO2020/010052 discloses a composition comprising the following components: A) a first ethylene/alpha-olefin interpolymer with a melt index I2A; B) a second ethylene/alpha-olefin interpolymer with a melt index I2B; and wherein the difference in melt index (12): (I2A-I2B) ≥400, and wherein I2B ≤100 g/10 min C) a filler, and wherein the filler is present in an amount ≥50 wt %, based on the weight of the composition: D) a tackifier; and wherein the melt viscosity, at 165° C., of the composition, excluding the filler (component C), is ≤30,000 cP. The compositions contain a significant amount of filler to reduce costs.

AU2012278379B2 discloses an ethylene alpha olefin interpolymer having i) a number average molecular weight ($M_n$) from 1,000 to 9,000; and ii) a Brookfield Viscosity (measured at 149° C./300° F.) from 500 to 9,000 cP; and wherein the interpolymer comprises a high weight average molecular weight polymer component ($M_w$H) and a low weight average molecular weight polymer component ($M_w$L), and wherein the ratio $M_w$H/$M_w$L is from about 1.5 to about 20. The high weight average molecular weight component and the low weight average component are prepared from different catalysts, but the same monomers, under substantially the same polymerization conditions. The resulting interpolymers have relatively low molecular weight and low viscosity, and relatively high density (from 0.88 g/cm$^3$ to 1.06 g/cm$^3$). The interpolymers may be combined with 15 to 40 wt % tackifier. See, for example, claims 1 and 2.

Additional polymer compositions are disclosed in WO2006/004750, U.S. Pat. No. 6,610,408 and US2014/0037876. However, as discussed above, there remains a need for polymer compositions that provide excellent mechanical properties, and can be readily processed on high speed processing equipment. This need has been met by the following invention.

SUMMARY OF THE INVENTION

A composition comprising at least the following: a first composition comprising components a and b:

a) a first ethylene/alpha-olefin interpolymer comprising an I2≤100 dg/min, and a density ≤0.880 g/cc, and b) a second ethylene/alpha-olefin interpolymer comprising an I2>100 dg/min; and wherein the first composition meets the following relationship: $y \leq 1.26 \ln(x) - 3.90$, where y=weight ratio of the second interpolymer to the first interpolymer, and x=the I2 ratio of the second interpolymer to the first interpolymer; and wherein the composition comprises ≥60 wt % of the sum of the first interpolymer and the second interpolymer, based on the weight of the composition.

DETAILED DESCRIPTION OF THE INVENTION

Figure 1:
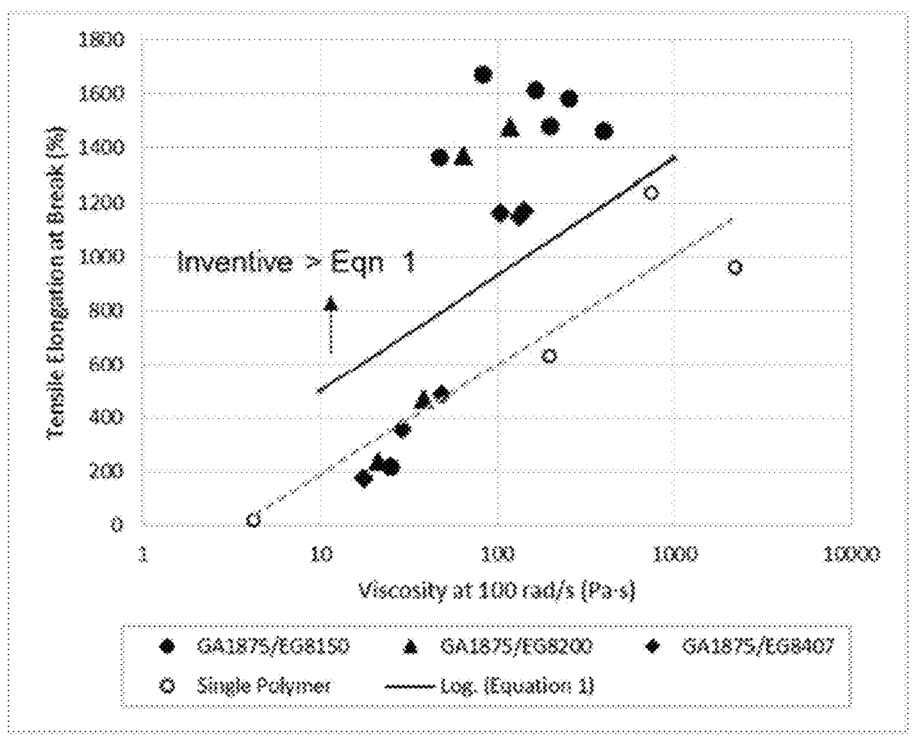
FIG. 1 depicts the Tensile Elongation at Break as a function of DMS viscosity (190° C., 10% strain, 100 rad/s) for inventive and comparative compositions.

Compositions were discovered that have improved mechanical properties, such as tensile properties that exceed expected values from single polymer components. These compositions have reduced melt viscosity for improved processability. The compositions may be used in a number of applications, where high elongation and high shear thinning rheology and/or processing at fast speeds are needed.

The composition may be manufactured by any number of mixing methods, including twin screw extrusion, single screw extrusion, and batch mixers; and by polymerizing in-reactor blends.

As discussed, a composition is provided, which comprises a first composition comprising components a and b:

a) a first ethylene/alpha-olefin interpolymer comprising an I2 ≤100 dg/min, and a density ≤0.880 g/cc, and b) a second ethylene/alpha-olefin interpolymer comprising an I2 ≥100 dg/min; and wherein the first composition meets the following relationship: $y \leq 1.26 \ln(x) - 3.90$, where y=weight ratio of the second interpolymer to the first interpolymer, and x=the I2 ratio of the second interpolymer to the first interpolymer; and wherein the composition comprises ≥60 wt % of the sum of the first interpolymer and the second interpolymer, based on the weight of the composition.

An inventive composition may comprise one or more embodiments as described herein. Each component a and b may comprise one or more embodiments as described herein.

In one embodiment, or a combination of two or more embodiments, each described herein, the first composition meets the following relationship: $y \leq 1.26 \ln(x) - 3.91$.

In one embodiment, or a combination of two or more embodiments, each described herein, the second ethylene/alpha-olefin interpolymer has a density ≥0.860 g/cc, or ≥0.862 g/cc, or ≥0.864 g/cc, or ≥0.866 g/cc, or ≥0.868 g/cc, or ≥0.870 g/cc (1 cc=1 $cm^3$). In one embodiment, or a combination of two or more embodiments, each described herein, the second ethylene/alpha-olefin interpolymer has a density ≤0.880 g/cc, or ≤0.878 g/cc, or ≤0.876 g/cc, or ≤0.874 g/cc, or ≤0.872 g/cc.

In one embodiment, or a combination of two or more embodiments, each described herein, the first ethylene/alpha-olefin interpolymer has a density ≥0.860 g/cc, or ≥0.862 g/cc, or ≥0.864 g/cc, or ≥0.866 g/cc, or ≥0.868 g/cc, or ≥0.870 g/cc (1 cc=1 $cm^3$). In one embodiment, or a combination of two or more embodiments, each described herein, the first ethylene/alpha-olefin interpolymer has a density ≤0.879 g/cc, or ≤0.878 g/cc, or ≥0.877 g/cc, or ≤0.876 g/cc, or ≥0.875 g/cc, or ≤0.874 g/cc, or ≥0.873 g/cc, or ≤0.872 g/cc.

In one embodiment, or a combination of two or more embodiments, each described herein, the density ratio of the second interpolymer to the first interpolymer is ≥0.80, or ≥0.85, or ≥0.90, or ≥0.95, or ≥1.00. In one embodiment, or a combination of two or more embodiments, each described herein, the density ratio of the second interpolymer to the first interpolymer is ≤1.20, or ≤1.15, or ≤1.10, or ≤1.05, or ≤1.02.

In one embodiment, or a combination of two or more embodiments, each described herein, the second interpolymer has an I2 value ≥200 dg/min, or ≥300 dg/min, or ≥400 dg/min, or ≥500 dg/min, or ≥600 dg/min, or ≥700 dg/min. In one embodiment, or a combination of two or more embodiments, each described herein, the second interpolymer has an I2 value ≤1500 dg/min, or ≤1450 dg/min, or ≤1400 dg/min, or ≤1350 dg/min, or ≤1300 dg/min, or ≤1250 dg/min, or ≤1200 dg/min.

In one embodiment, or a combination of two or more embodiments, each described herein, the first interpolymer has an I2 value ≥0.01 dg/min, or ≥0.02 dg/min, or ≥0.05 dg/min, or ≥0.10 dg/min., or ≥0.20 dg/min, or ≥0.50 dg/min, or ≥0.70 dg/min, or ≥1.0 dg/min, or ≥2.0 dg/min., or ≥5.0 dg/min. In one embodiment, or a combination of two or more embodiments, each described herein, the first interpolymer has an I2 value ≤70 dg/min, or ≤60 dg/min, or ≤50 dg/min, or ≤40 dg/min, or ≤30 dg/min, or ≤20 dg/min, or ≤10 dg/min, or ≤7.0 dg/min.

In one embodiment, or a combination of two or more embodiments, each described herein, the I2 ratio of the second interpolymer to the first interpolymer is ≥25, or ≥30, or ≥35, or ≥40. In one embodiment, or a combination of two or more embodiments, each described herein, the I2 ratio of the second interpolymer to the first interpolymer is ≤3000, or ≤2800, or ≤2600, or ≤2400, or ≤2200, or ≤2000, or ≤1500, or ≤1000, or ≤500.

In one embodiment, or a combination of two or more embodiments, each described herein, the weight ratio of the second interpolymer to the first interpolymer is ≥0.10, or ≥0.15, or ≥0.20, or ≥0.25, or ≥0.30, or ≥0.35, or ≥0.40, or ≥0.50, or ≥0.60, or ≥0.70, or ≥0.80, or ≥0.90, or ≥1.00, or ≥1.05. In one embodiment, or a combination of two or more embodiments, each described herein, the weight ratio of the second interpolymer to the first interpolymer is ≤6.00, or ≤5.50, or ≤0.00, or ≤4.80, or ≤4.60, or ≤4.40, or ≥4.20, or ≤4.00.

In one embodiment, or a combination of two or more embodiments, each described herein, the composition comprises ≥65 wt %, or ≥70 wt %, or ≥75 wt %, or ≥80 wt %, or ≥85 wt %, or ≥90 wt %, or ≥95 wt % of the sum of the first and second interpolymers, based on the weight of the composition. In one embodiment, or a combination of two or more embodiments, each described herein, the composition comprises ≤100 wt %, or ≤99 wt %, or ≤98 wt % of the sum of the first and second interpolymers, based on the weight of the composition.

In one embodiment, or a combination of two or more embodiments, each described herein, the second interpolymer has a melt viscosity (177° C.)≥3,500 cP, or ≥4,000 cP, or ≥4,200 cP, or ≥4,400 cP, or ≥4.600 cP, or ≥4,800 cP, or ≥5,000 cP, or ≥5,200 cP, or ≥5,400 cP, or ≥5.600 cP, or ≥5,800 cP, or ≥6,000 cP, or ≥6,200 cP, or ≥6,400 cP, or ≥6.600 cP. In one embodiment, or a combination of two or more embodiments, each described herein, the second interpolymer has a melt viscosity (177° C.) ≤28,000 cP, or ≤26,000 cP, or ≤24,000 cP, or ≤22,000 cP, or ≤20,000 cP, or ≤18,000 cP, or ≤16,000 cP, or ≤15,000 cP, or ≤14,000 cP, or ≤13,000 cP, or ≤12,000 cP, or ≤11,000 cP, or ≤10,000 cP.

In one embodiment, or a combination of two or more embodiments, each described herein, the second interpolymer has a molecular weight distribution MWD (=Mw/Mn) ≥1.80, or ≥1.90, or ≥2.00, or ≥2.10, or ≥2.15, or ≥2.20, or ≥0.25, or ≥2.30, or ≥2.35 or ≥2.40, or ≥2.45, or ≥2.50. In one embodiment, or a combination of two or more embodiments, each described herein, the second interpolymer has a molecular weight distribution MWD ≤3.00, or ≤2.90, or ≤2.80, or ≤2.70, ≤2.65, or ≤2.60.

In one embodiment, or a combination of two or more embodiments, each described herein, the first interpolymer has a molecular weight distribution MWD (=Mw/Mn) ≥1.80, or ≥1.85, or ≥1.90, or ≥1.95, or ≥2.00, or ≥2.05, or ≥2.10. In one embodiment, or a combination of two or more embodiments, each described herein, the first interpolymer has a molecular weight distribution MWD ≤2.80, or ≤2.75, or ≤2.70, or ≤2.65, or ≤2.60, or ≤2.55, or ≤2.50, or ≤2.45, or ≤2.40, or ≤2.35.

In one embodiment, or a combination of two or more embodiments, each described herein, the second ethylene/alpha-olefin interpolymer is an ethylene/alpha-olefin copolymer.

In one embodiment, or a combination of two or more embodiments, each described herein, the first ethylene/alpha-olefin interpolymer is an ethylene/alpha-olefin copolymer.

In one embodiment, or a combination of two or more embodiments, each described herein, the composition has a DMS viscosity (190° C., 10% strain, 0.1 rad/s) ≥60 Pa·s, or ≥70 Pa·s, or ≥80 Pa·s, or ≥90 Pa·s, or ≥100 Pa·s. In one embodiment, or a combination of two or more embodiments, each described herein, the composition has a DMS viscosity (190° C., 10% strain, 0.1 rad/s)≤5000 Pa·s, or ≤4000 Pa·s, or ≤3000 Pa·s, or ≤2000 Pa·s, or ≤1500 Pa·s, or ≤1000 Pa·s, or ≤800 Pa·s, or ≤700 Pa·s, or ≤600 Pa·s.

In one embodiment, or a combination of two or more embodiments, each described herein, the composition has a DMS viscosity (190° C., 10%, strain, 100 rad/s) ≥30 Pa·s, or ≥35 Pa·s, or ≥40 Pa·s, or ≥45 Pa·s, or ≥50 Pa·s. In one embodiment, or a combination of two or more embodiments, each described herein, the composition has a DMS viscosity (190° C., 10% strain, 100 rad/s) ≤500 Pa·s, ≤480 Pa·s, or ≤450 Pa·s, or ≤420 Pa·s, or ≤400 Pa·s, or ≤380 Pa·s, or ≤350 Pa·s, or ≤320 Pa·s, or ≤300 Pa·s.

In one embodiment, or a combination of two or more embodiments, each described herein, composition meets the following relationship: $y(x_1) \geq 186.75 \ln(x_1) + 70.00$, where y=Tensile Elongation at Break. and x1=Viscosity at 100 rad/s, 10% strain and 190° C.

In one embodiment, or a combination of two or more embodiments, each described herein, the composition meets the following relationship: $y(x_2) \geq 131.01 \ln(x_2) + 323.33$, where y=Tensile Elongation at Break, and x2=Viscosity at 0.1 rad/s, 10% strain and 190° C.

Also provided is an article comprising at least one component formed from the composition of any one embodiment, or a combination of two or more embodiments, each described herein. In one embodiment, or a combination of two or more embodiments, each described herein, the article is a carpet.

Ethylene/Alpha-Olefin Interpolymers

The ethylene/alpha-olefin interpolymer comprises, in polymerize form, ethylene, and an alpha-olefin. Alpha-olefins include, but are not limited to, a C3-C20 alpha-olefins, further C3-C10 alpha-olefins, further C3-C8 alpha-olefins, such as propylene, 1-butene, 1-hexene, and 1-octene.

Such interpolymers also include ethylene/alpha-olefin/nonconjugated polyene interpolymers, which comprise, in polymerize form, ethylene, an alpha-olefin, and a nonconjugated polyene. The alpha-olefin may be either an aliphatic or an aromatic compound. Alpha-olefins include, but are not limited to, a C3-C20 alpha-olefins, further C3-C10 alpha-olefins, further C3-C8 alpha-olefins. In one embodiment, the interpolymer is an ethylene/propylene/nonconjugated polyene interpolymer, further a terpolymer, further an EPDM. Suitable examples of nonconjugated polyenes include the C4-C40 nonconjugated dienes. Nonconjugated dienes include, but are not limited to, 5-ethylidene-2-norbornene (ENB), 5-vinyl-2-norbornene (VNB), dicyclopentadiene, 1,4-hexadiene, or 7-methyl-1,6-octadiene, and further from ENB, VNB, dicyclopentadiene or 1,4-hexadiene, and further from ENB or VNB, and further ENB.

Additives

An inventive composition may include one or more additives. Nonlimiting examples of suitable additives include fillers, antioxidants, flame retardants, and antimicrobial agents. Fillers include, but are not limited to, calcium carbonate ($CaCO_3$), coal fly ash, barium sulfate, and clay (aluminum hydroxide silicate). Filler may also include high heat content fillers, such as limestone, marble, quartz, silica, and barite ($BaSO_4$).

In an embodiment, the composition comprises at least one antioxidant. An antioxidant protects the composition from degradation caused by reaction with oxygen, induced by such things as heat, light, or residual catalyst present in a commercial material. Suitable antioxidants include those commercially available from BASF, such as IRGANOX B225. IRGANOX 1010. IRGANOX 1076 and IRGANOX 1726. These antioxidants, which act as radical scavengers, may be used alone, or in combination with other antioxidants, such as phosphite antioxidants like IRGAFOS 168, also available from BASF. In an embodiment, the composition comprises from 0.01 wt %, or 0.02 wt %, or 0.04 wt %, or 0.06 wt %, or 0.08 wt %, or 0.10 wt %, or 0.20 wt % to 0.30 wt %, or 0.40 wt %, or 0.50 wt %, or 0.60 wt %, or 0.80 wt % or 1.00 wt % of at least one antioxidant. Weight percent is based on total weight of the composition.

DEFINITIONS

Unless stated to the contrary, implicit from the context, or customary in the art, all parts and percentages are based on weight, and all test methods are current as of the filing date of this disclosure.

The term "composition," as used herein, includes a mixture of materials, which comprise the composition, as well as reaction products and decomposition products formed from the materials of the composition. Any reaction product or decomposition product is typically present in trace or residual amounts.

The term "polymer," as used herein, refers to a polymeric compound prepared by polymerizing monomers, whether of the same or a different type. The generic term polymer thus, includes the term homopolymer (employed to refer to polymers prepared from only one type of monomer, with the understanding that trace amounts of impurities can be incorporated into the polymer structure), and the term interpolymer as defined hereinafter. Trace amounts of impurities, such as catalyst residues, can be incorporated into and/or within the polymer. Typically, a polymer is stabilized with very low amounts ("ppm" amounts) of one or more stabilizers, such as one or more antioxidants.

The term "interpolymer," as used herein, refers to a polymer prepared by the polymerization of at least two different types of monomers. The term interpolymer thus includes the term copolymer (employed to refer to polymers prepared from two different types of monomers) and polymers prepared from more than two different types of monomers.

The term "olefin-based polymer," as used herein, refers to a polymer that comprises, in polymerized form, 50 wt % or a majority weight percent of an olefin, such as ethylene or propylene (based on the weight of the polymer), and optionally may comprise one or more comonomers.

The term "propylene-based polymer," as used herein, refers to a polymer that comprises, in polymerized form, a majority weight percent of propylene (based on the weight of the polymer), and optionally may comprise one or more comonomers.

The term "ethylene-based polymer," as used herein, refers to a polymer that comprises, in polymerized form, 50 wt % or a majority weight percent of ethylene (based on the weight of the polymer), and optionally may comprise one or more comonomers.

The term "ethylene/alpha-olefin interpolymer," as used herein, refers to a random interpolymer that comprises, in polymerized form, 50 wt % or a majority weight percent of ethylene (based on the weight of the interpolymer), and an alpha-olefin.

The term, "ethylene/alpha-olefin copolymer," as used herein, refers to a random copolymer that comprises, in polymerized form, 50 wt % or a majority amount of ethylene monomer (based on the weight of the copolymer), and an alpha-olefin, as the only two monomer types.

The phrase "a majority weight percent," as used herein, in reference to a polymer (or interpolymer, or terpolymer or copolymer), refers to the amount of monomer present in the greatest amount in the polymer.

The terms "comprising," "including," "having," and their derivatives, are not intended to exclude the presence of any additional component, step or procedure, whether the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure, not specifically delineated or listed.

Listing of Some Composition Features

A] A composition comprising at least the following: a first composition comprising components a and b:
  a) a first ethylene/alpha-olefin interpolymer comprising an I2≤100 dg/min, and a density ≤0.880 g/cc, and
  b) a second ethylene/alpha-olefin interpolymer comprising an I2≥100 dg/min, and
  wherein the first composition meets the following relationship: y≤1.26 ln(x)−3.90, where y=weight ratio of the second interpolymer to the first interpolymer, and x=the I2 ratio of the second interpolymer to the first interpolymer; and
  wherein the composition comprises ≥60 wt % of the sum of the first interpolymer and the second interpolymer, based on the weight of the composition.

B] The composition of A] above, wherein the first composition meets the following relationship: y<1.26 ln(x)−3.90.

C] The composition of A] or B] above, wherein the first composition meets the following relationship: y≤1.26 ln(x)−3.91, or y≤1.26 ln(x)−3.92, or y≤1.26 ln(x)−3.94, or y≤1.26 ln(x)−3.96, or y≤1.26 ln(x)−3.98, or y≤1.26 ln(x)−4.00.

D[ The composition of any one of A]-C] (A] through C]) above, wherein the first composition has a DMS viscosity (190° C., 10% strain, 0.1 rad/s) ≥50 Pa·s, or ≥60 Pa·s, or ≥70 Pa·s, or ≥80 Pa·s, or ≥100 Pa·s.

E] The composition of any one of A]-D] above, wherein the first composition has a DMS viscosity (190° C., 10% strain, 0.1 rad/s)≤5000 Pa·s, or ≤4000 Pa·s, or ≤3000 Pa·s, or ≤2000 Pa·s, or ≤1800 Pa·s, or ≤1600 Pa·s, or ≤1400 Pa·s, or ≤1200 Pa·s, or ≤1000 Pa·s, or ≤800 Pa·s, or ≤600 Pa·s.

F] The composition of any one of A]-E] above, wherein the first composition has a DMS viscosity (190° C., 10% strain, 100 rad/s)≥20 Pa·s, or ≥30 Pa·s, or ≥40 Pa·s, or ≥50 Pa·s.

G] The composition of any one of A]-F] above, wherein the first composition has a DMS viscosity (190° C., 10% strain, 100 rad/s)≤600 Pa·s, or ≤550 Pa·s, or ≤500 Pa·s, or ≤450 Pa·s, or ≤400 Pa·s, or ≤350 Pa·s, or ≤300 Pa·s.

H] The composition of any one of A]-G] above, wherein the second ethylene/alpha-olefin interpolymer has a density ≥0.860 g/cc, or ≥0.862 g/cc, or ≥0.864 g/cc, or ≥0.866 g/cc, or ≥0.868 g/cc, or ≥0.870 g/cc (1 cc=1 $cm^3$).

K] The composition of any one of A]-H] above, wherein the second ethylene/alpha-olefin interpolymer has a density ≤0.880 g/cc, or ≤0.878 g/cc, or ≤0.876 g/cc, or ≤0.874 g/cc, or ≤0.872 g/cc.

J] The composition of any one of A]-I] above, wherein the first ethylene/alpha-olefin interpolymer has a density ≥0.860 g/cc, or ≥0.862 g/cc, or ≥0.864 g/cc, or ≥0.866 g/cc, or ≥0.868 g/cc, or ≥0.870 g/cc (1 cc=1 $cm^3$).

K] The composition of any one of A]-J] above, wherein the first ethylene/alpha-olefin interpolymer has a density ≤0.879 g/cc, or ≤0.878 g/cc, or ≤0.877 g/cc, or ≤0.876 g/cc, or ≤0.875 g/cc, or ≤0.874 g/cc, or ≤0.873 g/cc, or ≤0.872 g/cc.

L] The composition of any one of A]-K] above, wherein the density ratio of the second interpolymer to the first interpolymer is ≥0.80, or ≥0.85, or ≥0.90, or ≥0.95, or ≥1.00.

M] The composition of any one of A]-L] above, wherein the density ratio of the second interpolymer to the first interpolymer is ≤1.20, or ≤1.15, or ≤1.10, or ≤1.05, or ≤1.02.

N] The composition of any one of A]-M] above, wherein the second interpolymer has an I2 value ≥200 dg/min, or ≥300 dg/min, or ≥400 dg/min, or ≥500 dg/min, or ≥600 dg/min, or ≥700 dg/min.

O] The composition of any one of A]-N] above, wherein the second interpolymer has an I2 value ≤1500 dg/min, or ≤1450 dg/min, or ≤1400 dg/min, or ≤1350 dg/min, or ≤1300 dg/min, or ≤1250 dg/min, or ≤1200 dg/min.

P] The composition of any one of A]-O] above, wherein the first interpolymer has an I2 value ≥0.01 dg/min, or ≥0.02 dg/min, or ≥0.05 dg/min, or ≥0.10 dg/min., or ≥0.20 dg/min, or ≥0.50 dg/min, or ≥0.70 dg/min, or ≥1.0 dg/min, or ≥2.0 dg/min, or ≥5.0 dg/min.

Q] The composition of any one of A]-P] above, wherein the first interpolymer has an I2 value ≤70 dg/min, or ≤60 dg/min, or ≤50 dg/min, or ≤40 dg/min, or ≤30 dg/min, or ≤20 dg/min, or ≤10 dg/min, or ≤7.0 dg/min.

R] The composition of any one of A]-Q] above, wherein the I2 ratio of the second interpolymer to the first interpolymer is ≥25, or ≥30, or ≥35, or ≥40.

S] The composition of any one of A]-R] above, wherein the I2 ratio of the second interpolymer to the first interpolymer is ≤3000, or ≤2800, or ≤2600, or ≤2400, or ≤2200, or ≤2000, or ≤1500, or ≤1000, or ≤500.

T] The composition of any one of A]-S] above, wherein the first composition comprises ≥10 wt %, ≥12 wt %, or ≥15 wt %, or ≥18 wt %, or ≥20 wt %, ≥22 wt %, or ≥25 wt %, or ≥30 wt %, or ≥35 wt %, or ≥40 wt %, or ≥50 wt % of the second interpolymer, based on the weight of the first composition.

U] The composition of any one of A]-T] above, wherein the first composition comprises ≤90 wt %, or ≤88 wt %, or ≤86 wt %, or ≤84 wt %, or ≤82 wt %, or ≤80 wt %, or ≤75 wt %, or ≤70 wt % of the second interpolymer, based on the weight of the first composition.

V] The composition of any one of A]-U] above, wherein the weight ratio of the second interpolymer to the first interpolymer is ≥0.10, or ≥0.15, or ≥0.20, or ≥0.25, or ≥0.30, or ≥0.35, or ≥0.40, or ≥0.50, or ≥0.60, or ≥0.70, or ≥0.80, or ≥0.90, or ≥1.00, or ≥1.05.

W] The composition of any one of A]-V] above, wherein the weight ratio of the second interpolymer to the first interpolymer is ≤6.00, or ≤5.50, or ≤5.00, or ≤4.80, or ≤4.60, or ≤4.40, or ≤4.20, or ≤400.

X] The composition of any one of A]-W] above, wherein the first composition comprises ≥65 wt %, or ≥70 wt %, or ≥75 wt %, or ≥80 wt %, or ≥85 wt %, or ≥90 wt %, or ≥95 wt % of the sum of the first and second interpolymers, based on the weight of the first composition.

Y] The composition of any one of A]-X] above, wherein the first composition comprises ≤100 wt %, or ≤99 wt %, or ≤98 wt % of the sum of the first and second interpolymers, based on the weight of the first composition.

Z] The composition of any one of A]-Y] above, wherein the composition comprises ≥65 wt %, or ≥70 wt %, or ≥75 wt %, or ≥80 wt %, or ≥85 wt %, or ≥90 wt %, or ≥95 wt % of the sum of the first and second interpolymers, based on the weight of the composition.

A2] The composition of any one of A]-Z] above, wherein the composition comprises ≤100 wt %, or, ≤99 wt %, or ≤598 wt % of the sum of the first and second interpolymers, based on the weight of the composition.

B2] The composition of any one of A]-A2] above, wherein the composition comprises ≥50 wt %, or ≥60 wt %, or ≥70 wt %, or ≥80 wt %, or ≥85 wt %, or ≥90 wt %, or ≥95 wt % of the first composition, based on the weight of the composition.

C2] The composition of any one of A]-B2] above, wherein the composition comprises ≤100 wt %, or ≤99 wt %, or ≤98 wt % of first composition, based on the weight of the composition.

D2] The composition of any one of A]-C2] above, wherein the second interpolymer has a melt viscosity (177° C.)≥3,500 cP, or ≥4,000 cP, or ≥4,200 cP, or ≥4,400 cP, or ≥4,600 cP, or ≥4,800 cP, or ≥5,000 cP, or ≥5,200 cP, or ≥5,400 cP, or ≥5,600 cP, or ≥5,800 cP, or ≥6,000 cP, or ≥6,200 cP, or ≥6,400 cP, or ≥6,600 cP.

E2] The composition of any one of A]-D2] above, wherein the second interpolymer has a melt viscosity (177° C.)≤30.000 cP, or ≤28,000 cP, or ≤26,000 cP), or ≤24,000 cP, or ≤22,000 cP, or ≤20,000 cP, or ≤18,000 cP, or ≤16,000 cP, or ≤15,000 cP, or ≤14,000 cP, or ≤13,000 cP, or ≤12,000 cP, or ≤11,000 cP, or ≤10,000 cP.

F2] The composition of any one of A]-E2] above, wherein the second interpolymer has a Tm ≥62° C., or ≥63° C., or ≥64° C., or ≥65° C., or ≥66° C., or ≥67° C., or ≥68° C.

G2] The composition of any one of A]J-F2] above, wherein the second interpolymer has a Tm ≤85° C., or ≤82° C., or ≤80° C., or ≤78° C., or ≤76° C., or ≤74° C., or ≤73° C.

H2] The composition of any one of A]-G2] above, wherein second interpolymer has a glass transition temperature Tg ≥−70° C., or ≥−75° C., or ≥−70° C., or ≥−65° C., or ≥−60° C.

I2] The composition of any one of A]-H2] above, wherein second interpolymer has a glass transition temperature Tg ≤−30° C., or ≤−35° C., or ≤−40° C., or ≤−45° C., or ≤−50° C.

J2] The composition of any one of A]-I2] above, wherein the second interpolymer has a percent crystallinity ≥10%, or ≥12%, or ≥13%, or ≥14%, or ≥15%, or ≥16%.

K2] The composition of any one of A]-J2] above, wherein the second interpolymer has a percent crystallinity ≤50%, or ≤45%, or ≤40%, or ≤35%, or ≤30%, or ≤25%, or ≤24%.

L2] The composition of any one of A]-K2] above, wherein the second interpolymer has a molecular weight distribution MWD (=Mw/Mn) ≥1.80, or ≥1.90, or ≥2.00, or ≥2.10, or ≥2.15, or ≥2.20, or ≥2.25, or ≥2.30, or ≥2.35, or ≥2.40, or ≥2.45, or ≥2.50.

M2] The composition of any one of A]-L2] above, wherein the second interpolymer has a molecular weight distribution MWD ≤3.00, or ≤2.90, or ≤0.80, or ≤2.70, or ≤2.65 or ≤2.60.

N2] The composition of any one of A]-M2] above, wherein the second interpolymer has a weight average molecular weight Mw ≥6,000 g/mol, or ≥8,000 g/mol, or ≥10,000 g/mol, or ≥12,000 g/mol, or ≥14,000 g/mol, or ≥16,000 g/mol.

O2] The composition of any one of A]-N2] above, wherein the second interpolymer has a weight average molecular weight Mw ≤60,000 g/mol, or ≤55,000 g/mol, or ≤50,000 g/mol, or ≤45,000 g/mol, or ≤40,000 g/mol, or ≤35,000 g/mol, or ≤30,000 g/mol, or ≤25,000 g/mol, or ≤20,000 g/mol.

P2] The composition of any one of A]-O2] above, wherein the first interpolymer has a molecular weight distribution MWD (=Mw/Mn) ≥1.80, or ≥1.85, or ≥1.90, or ≥1.95, or ≥2.00, or ≥2.05, or ≥2.10.

Q2] The composition of any one of A]-P2] above, wherein the first interpolymer has a molecular weight distribution MWD ≤2.80, or ≤2.75, or ≤2.70, or ≤2.65, or ≤2.60, or ≤2.55, or ≤2.50, or ≤2.45, or ≤2.40, or ≤2.35.

R2] The composition of any one of A]-Q2] above, wherein the first interpolymer has a weight average molecular weight Mw ≥30,000 g/mol, or ≥35,000 g/mol, or ≥40,000 g/mol, or ≥45,000 g/mol.

S2] The composition of any one of A]-R2] above, wherein the first interpolymer has a weight average molecular weight Mw ≤200,000 g/mol, or ≤190,000 g/mol, or ≤180,000 g/mol, or ≤170,000 g/mol, or ≤165,000 g/mol, or ≤160,000 g/mol, or ≤155,000 g/mol, or ≤150,000 g/mol, or ≤145,000 g/mol, or ≤140,000 g/mol, or ≤135,000 g/mol, or ≤130,000 g/mol.

T2] The composition of any one of A]-S2] above, wherein the MWD ratio of the second interpolymer to the first interpolymer is ≥0.80, or ≥0.85, or ≥0.90, or ≥0.95, or ≥1.00, or ≥1.05, or ≥1.10.

U2] The composition of any one of A]-T2] above, wherein the MWD ratio of the second interpolymer to the first interpolymer is ≤1.50, or ≤1.45, or ≤1.40, or ≤1.35, or ≤1.30, or ≤1.25.

V2] The composition of any one of A]-U2] above, wherein the second ethylene/alpha-olefin interpolymer is an ethylene/alpha-olefin copolymer.

W2] The composition of any one of A]-V2] above, wherein, for the second interpolymer, the alpha-olefin is a C3-C20 alpha-olefin, further a C3-C10 alpha-olefin, further a C3-C8 alpha-olefin, further propylene, I-butene, 1-hexene or 1-octene, further propylene, 1-butene or 1-octene, further 1-butene or 1-octene, further 1-octene.

X2] The composition of any one of A]-V2] above, wherein, for the second interpolymer, the alpha-olefin is selected from styrene, propylene, 1-butene, 1-hexene, 1-octene, 4-methyl-1-pentene, or 1-decene.

Y2] The composition of any one of A]-X2] above, wherein the first ethylene/alpha-olefin interpolymer is an ethylene/alpha-olefin copolymer.

Z2] The composition of any one of A]-Y2] above, wherein, for the first interpolymer, the alpha-olefin is a C3-C20 alpha-olefin, further a C3-C10 alpha-olefin, further a C3-C8 alpha-olefin, further propylene, 1-butene, 1-hexene or 1-octene, further propylene, 1-butene or 1-octene, further 1-butene or 1-octene, further 1-octene.

A3] The composition of any one of A]-Y2] above, wherein, for the first interpolymer, the alpha-olefin is selected from styrene, propylene, 1-butene, 1-hexene, 1-octene, 4-methyl-1-pentene, or 1-decene.

B3] The composition of any one of A]-A3] above, wherein the composition has a DMS viscosity (190° C., 10% strain, 0.1 rad/s) ≥60 Pa·s, or ≥70 Pa·s, or ≥80 Pa·s, or ≥90 Pa·s, or ≥100 Pa·s.

C3] The composition of any one of A]-B3] above, wherein, the composition has a DMS viscosity (190° C., 10% strain, 0.1 rad/s) ≤5000 Pa·s, or ≤4000 Pa·s, or ≤3000 Pa·s, or ≤2000 Pa·s, or ≤100 Pa·s, or ≤1000 Pa·s, or ≤800 Pa·s, or ≤700 Pa·s, or ≤600 Pa·s.

D3] The composition of any one of A]-C3] above, wherein, the composition has a DMS viscosity (190° C., 10% strain, 100 rad/s) ≥30 Pa·s, or ≥35 Pa·s, or ≥40 Pa·s, or ≥45 Pa·s, or ≥50 Pa·s.

E3] The composition of any one of A]-D3] above, wherein, the composition has a DMS viscosity (190° C., 10% strain, 100 rad/s) ≤500 Pa·s, or ≤480 Pa·s, or ≤450 Pa·s, or ≤420 Pa·s, or ≤400 Pa·s, or ≤380 Pa·s, or ≤350 Pa·s, or ≤320 Pa·s, or ≤300 Pa·s.

F3] The composition of any one of A]-E3] above, wherein, the composition meets the following relationship: y $(x_1)$ ≥186.75 $\ln(x_1)$+70.00, where y=Tensile Elongation at Break, and x1=Viscosity at 100 rad/s, 10% strain, and 190° C.

G3] The composition of any one of A]-F3] above, wherein, the composition meets the following relationship: $y(x_2)$ ≥131.01 $\ln(x_2)$+323.33, where y=Tensile Elongation at Break, and x2=Viscosity at 0.1 rad/s, 10% strain and 190° C.

H3] The composition of any one of A]-G3] above, wherein the composition has a Tensile Elongation at Break ≥800%, or ≥900%, or ≥950%, or ≥1000%, or ≥1050%, or ≥1100%.

I3] The composition of any one of A]-H3] above, wherein the composition has a Tensile Elongation at Break ≤5000%, or ≤4000%, or ≤3000%.

J3] The composition of any one of A]-I3] above, wherein the composition has a Tensile Strength ≥300 psi, or ≥320 psi, or ≥350 psi, or ≥400 psi, or ≥450 psi, or ≥500 psi.

K3] The composition of any one of A]-J3] above, wherein the composition has a Tensile Strength ≤5000 psi, or ≤4000 psi, or ≤3000 psi.

L3] The composition of any one of A]-K3] above, wherein the composition comprises at least one filler.

M3] The composition of any one of A]-L3] above, wherein the composition comprises ≥0, or ≥0.5 wt %, or ≥1.0 wt % to ≤20 wt %, or ≤10 wt %, or ≤5.0 wt % of a filler, based on the weight of the composition.

N3] The composition of any one of A]-K3] above, wherein the composition does not comprise a filler.

O3] The composition of any one of A]-N3] above, wherein the composition comprises at least one antioxidant, and further from 0.01 wt %, or 0.02 wt %, or 0.04 wt %, or 0.06 wt %, or 0.08 wt %, or 0.10 wt %, or 0.20 wt % to 0.30 wt %, or 0.40 wt %, or 0.50 wt %, or 0.60 wt %, or 0.80 wt % or 1.00 wt % of the at least one antioxidant.

P3] The composition of any one of A]-O3] above, wherein the first composition has a density ≥0.860 g/cc, or ≥0.861 g/cc, or ≥0.862 g/cc, or ≥0.863 g/cc, or ≥0.864 g/cc, or ≥0.865 g/cc, or ≥0.866 g/cc, or ≥0.867 g/cc, or ≥0.868 g/cc, or ≥0.869 cc, or ≥0.870 g/cc (1 cc=1 $cm^3$). Density of first composition (ρ) is determined using $$\rho = \frac{\rho_1 \rho_2}{\rho_1 w_2 + \rho_2 w_1},$$

where $\rho_1$ and $\rho_2$ are the density of the first interpolymer and the density of the second interpolymer, respectively, and $w_1$ and $w_2$ are the weight fraction of first interpolymer and the weight fraction of the second interpolymer, respectively; and $w_1+w_2=1$.

Q3] The composition of any one of A]-P3] above, wherein the first composition has a density ≤0.880 g/cc, or ≤0.879 g/cc, or ≤0.878 g/cc, or ≤0.877 g/cc, or ≤0.876 g/cc, or ≤0.875 g/cc, or ≤0.874 g/cc, or ≤0.873 g/cc, or ≤0.872 g/cc, or ≤0.871 g/cc.

R3] The composition of any one of A]-Q3] above, wherein the composition has a density ≥0.860 g/cc, or ≥0.861 g/cc, or ≥0.862 g/cc, or ≥0.863 g/cc, or ≥0.864 g/cc, or ≥0.865 g/cc, or ≥0.866 g/cc, or ≥0.867 g/cc, or ≥0.868 g/cc, or ≥0.869 g/cc, or ≥0.870 g/cc (1 cc=1 $cm^3$).

S3] The composition of any one of A]-R3] above, wherein the composition has a density ≤0.880 g/cc, or ≤0.879 g/cc, or ≤0.878 g/cc, or ≤0.877 g/cc, or ≤0.876 g/cc, or ≤0.875 g/cc, or ≤0.874 g/cc, or ≤0.873 g/cc, or ≤0.872 g/cc, or ≤0.871 g/cc.

T3] The composition of any one of A]-S3] above, wherein the composition further comprises a thermoplastic polymer, different from the first interpolymer and the second interpolymer in one or more features, such as monomer(s) types and/or amounts, melt index (I2), Tm, Tg, % cryst., density, viscosity (177° C.), Mn, Mw, MWD, or any combination thereof, and further, in one or more features, such as monomer(s) types and/or amounts, melt index (I2), density, viscosity (177° C.), or any combination thereof.

U3] An article comprising at least one component formed from the composition of any one of A]-T3] above.

V3] The article of U3] above, wherein the article is a carpet.

W3] A method to form the composition of any one of A]-S3] above, said method comprising mixing together the first interpolymer and the second interpolymer.

X3] A method of W3] above, wherein the mixing takes place in at least one extruder or at least one batch mixer.

Test Methods

Differential Scanning Calorimetry (DSC)

Differential Scanning Calorimetry (DSC) can be used to measure the melting, crystallization, and glass transition behavior of a polymer over a wide range of temperature. For example, the TA Instruments Discovery DSC, equipped with an RCS (refrigerated cooling system) and an autosampler, is used to perform this analysis. During testing, a nitrogen purge gas flow of 50 mil/min is used. Each sample is melt pressed into a thin film at about 190° C.; the melted sample is then air-cooled to room temperature (about 25° C.). A "6 mm diameter (3-10 mg)" disc is extracted from the cooled film, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 5 minutes in order to remove its thermal history. Next, the sample is cooled to −90° C., at a 10° C./minute cooling rate, and held isothermal at −90° C. for 5 minutes. The sample is then heated to 150° C. (this is the "second heat" ramp) at a 10° C./minute heating rate. The cooling and second heating curves are recorded.

Unless otherwise stated, melting point (Tm) and the glass transition temperature (Tg) of each polymer sample were determined from the second heat curve, and the crystallization temperature (Tc) was determined from the first cooling curve. The Tg and the peak temperature for the Tm were recorded. The percent crystallinity can be calculated by dividing the heat of fusion (Hf), determined from the second heat curve, by a theoretical heat of fusion of 292 J/g for PE, and multiplying this quantity by 100 (for example, % cryst.=[(Hf/292 J/g)×100].

Gel Permeation Chromatography

The chromatographic system consisted of a PolymerChar GPC-IR (Valencia, Spain) high temperature GPC chromatograph, equipped with an internal IR5 infra-red detector (IR5). The autosampler oven compartment was set at 160° Celsius, and the column compartment was set at 150° Celsius. The columns were four AGILENT "Mixed A" 30 cm, 20-micron linear mixed-bed columns. The chromatographic solvent was 1,2,4-trichlorobenzene, which contained 200 ppm of butylated hydroxytoluene (BHT). The solvent source was nitrogen sparged. The injection volume was 200 microliters, and the flow rate was 1.0 milliliters/minute.

Calibration of the GPC column set was performed with 21 narrow molecular weight distribution polystyrene standards, with molecular weights ranging from 580 to 8,400,000, and which were arranged in six "cocktail" mixtures, with at least a decade of separation between individual molecular weights. The standards were purchased from Agilent Technologies. The polystyrene standards were prepared at "0.025 grams in 50 milliliters" of solvent, for molecular weights equal to, or greater than, 1,000,000, and at "0.05 grams in 50 milliliters" of solvent, for molecular weights less than 1,000,000. The polystyrene standards were dissolved at 80° Celsius, with gentle agitation, for 30 minutes. The polystyrene standard peak molecular weights were converted to polyethylene molecular weights using Equation 1 (as described in Williams and Ward, J. Polym. Sci. Polym. Let., 6, 621 (1968)): $M_{polyethylene}=A\times(M_{polystyrene})^B$ (EQ1), where M is the molecular weight, A has a value of 0.4315 and B is equal to 1.0.

A fifth order polynomial was used to fit the respective polyethylene equivalent calibration points. A small adjustment to A (from approximately 0.375 to 0.445) was made to correct for column resolution and band-broadening effects, such that linear homopolymer polyethylene standard was obtained at 120,000 Mw.

The total plate count of the GPC column set was performed with decane (prepared at "0.04 g in 50 milliliters" of TCB, and dissolved for 20 minutes with gentle agitation). The plate count (Equation 2) and symmetry (Equation 3) were measured on a 200 microliter injection according to the following equations:

$$\text{Plate Count} = 5.54 * \left(\frac{(RV_{Peak\ Max}}{\text{Peak Width at } \frac{1}{2} \text{ height}}\right)^2, \quad \text{(EQ2)}$$

where RV is the retention volume in milliliters, the peak width is in milliliters, the peak max is the maximum height of the peak, and ½ height is ½ height of the peak maximum; and $$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})}, \quad \text{(EQ3)}$$

where RV is the retention volume in milliliters, and the peak width is in milliliters, Peak max is the maximum position of the peak, one tenth height is 1/10 height of the peak maximum, and where rear peak refers to the peak tail at later retention volumes than the peak max, and where front peak refers to the peak front at earlier retention volumes than the peak max. The plate count for the chromatographic system should be greater than 18,000, and symmetry should be between 0.98 and 1.22.

Samples were prepared in a semi-automatic manner with the PolymerChar "Instrument Control" Software, wherein the samples were weight-targeted at "2 mg/ml," and the solvent (contained 200 ppm BHT) was added to a pre nitrogen-sparged, septa-capped vial, via the PolymerChar high temperature autosampler. The samples were dissolved for two hours at 160° Celsius under "low speed" shaking.

The calculations of $Mn_{(GPC)}$, $Mw_{(GPC)}$, and $Mz_{(GPC)}$ were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1. Equations 4-6 are as follows:

$$Mn_{(GPC)} = \frac{\sum^{i} IR_i}{\sum^{i} \left(IR_i / M_{polyethylene_i}\right)}, \quad \text{(EQ 4)}$$

-continued $$Mw_{(GPC)} = \frac{\sum^{i} \left(IR_i * M_{polyethylene_i}\right)}{\sum^{i} IR_i}, \text{ and} \quad \text{(EQ 5)}$$

$$Mz_{(GPC)} = \frac{\sum^{i} \left(IR_i * M^2_{polyethylene_i}\right)}{\sum^{i} \left(IR_i * M_{polyethylene_i}\right)}. \quad \text{(EQ 6)}$$

In order to monitor the deviations over time, a flowrate marker (decane) was introduced into each sample, via a micropump controlled with the PolymerChar GPC-IR system. This flowrate marker (FM) was used to linearly correct the pump flowrate (Flowrate(nominal)) for each sample, by RV alignment of the respective decane peak within the sample (RV(FM Sample)), to that of the decane peak within the narrow standards calibration (RV(FM Calibrated)). Any changes in the time of the decane marker peak were then assumed to be related to a linear-shift in flowrate (Flowrate (effective)) for the entire run. To facilitate the highest accuracy of a RV measurement of the flow marker peak, a least-squares fitting routine was used to fit the peak of the flow marker concentration chromatogram to a quadratic equation. The first derivative of the quadratic equation was then used to solve for the true peak position. After calibrating the system, based on a flow marker peak, the effective flowrate (with respect to the narrow standards calibration) was calculated from Equation 7: Flowrate(effective)=Flowrate(nominal)*(RV(FM Calibrated)/RV(FM Sample)) (EQ7). Processing of the flow marker peak was done via the PolymerChar GPCOne™ software. Acceptable flowrate correction is such that the effective flowrate should be within +/−0.7% of the nominal flowrate.

Melt Index

The melt index (I2) of an ethylene-based polymer is measured in accordance with ASTM D-1238, condition 190° C./2.16 kg. The melt flow rate MFR of a propylene-based polymer is measured in accordance with ASTM D-1238, condition 230° C./2.16 kg.

Density

ASTM D4703 was used to make a polymer plaque for density analysis. ASTM D792, Method B, was used to measure the density of each polymer.

Viscosity of the Polymer

The melt viscosity of each polymer (8-10 grams) was measured according to ASTM D3236, using a Brookfield Viscometer, model LVDV-1 Prime with a Thermosel. The viscosity was measured at 177° C., using spindle SC4-31.

Compression Molding

Each polymer composition was compression molded, using a Carver press, into one or more plaques for physical testing. Plaque dimensions were "6.0 in. by 2.5 in. by 0.125 in. thick." All compositions were compression molded according to ASTM D4703, at 190° C., with controlled cooling at 15° C./min. Pressure was applied at 3000 pounds for 6 minutes, then 15 tons for 4 minutes, then the cooling process began at 15° C./min, until mold reached about 30° C.

Microtensile Test—Mechanical Properties

Samples were punched from compression molded plaques (see above) using the ASTM die D1708. Specimens were tested according to ASTM D1708, at a test speed of 5 in/min. A minimum of five specimens were collected per composition, and the average value of each property was reported.

DMS Rheology

For each composition, samples were prepared by compression molding approximately 2.3 g material (composition), at 190° C. for 6 minutes at 25K psi pressure in a "2 in. by 3 in. by 3 mm thick" TEFLON coated chase. Circular test specimens, with 25 mm diameter, were cut out of the compression molded plaque. The "25 mm specimen" was loaded into a stainless steel, "25 mm parallel plate" fixture, and heated for 2.5 minutes at 190° C. The parallel plate gap was adjusted to 2.8 mm, and the excess material was trimmed from the plates. The sample was heated for an additional 2 minutes, at which point, the gap was reduced to 2 mm, and excess material was trimmed from the plate fixture immediately prior to testing. DMS frequency sweeps were carried out at 10% strain, from 0.1 to 100 rad/s, on a TA instruments ARES G2 Rheometer.

EXPERIMENTAL

Commercial materials are listed in Table 1.

TABLE 1

| Commercial Materials | | | | | | |
|---|---|---|---|---|---|---|
| Material | | I2 (dg/min) | Density (g/cc) | Mw (g/mol) | MWD | Brookfield Viscosity @ 177° C. (350° F.), cP |
| AFFINITY GA 1875* | EO | 1200 | 0.870 | 18617 | 2.59 | 6,700 |
| ENGAGE 8150** | EO | 0.5 | 0.870 | 129840 | 2.3 | 1.6 × 10ˆ6 |
| ENGAGE 8407** | EO | 30 | 0.870 | 48000 | 2.13 | 3.3 × 10ˆ5 |
| ENGAGE 8200** | EO | 5 | 0.870 | 73545 | 2.34 | 1.0 × 10ˆ6 |
| IRGANOX B225 available from BASF (antioxidant) | | | | | | |

*Available from The Dow Chemical Company: Tm = 70° C., Tg = −57 C., % cryst. = 22.

*$I = 3.6126(10^{(log(\eta)-6.6928)/-1.1363)} - 9.3185$, where $\eta$ = melt viscosity at 350° F. (177° C.).

**Available from The Dow Chemical Company.

Preparation of Compositions and Results

Each composition (See Table 2) was compounded in a HAAKE RHEOMIX 3000, fitted with roller compounding blades, at 60 RPM and 160° C., for 15 minutes. Polymer compositions are shown in Table 2 and their properties are shown in Table 3. See also FIG. 1 and FIG. 2.

Figure 2:
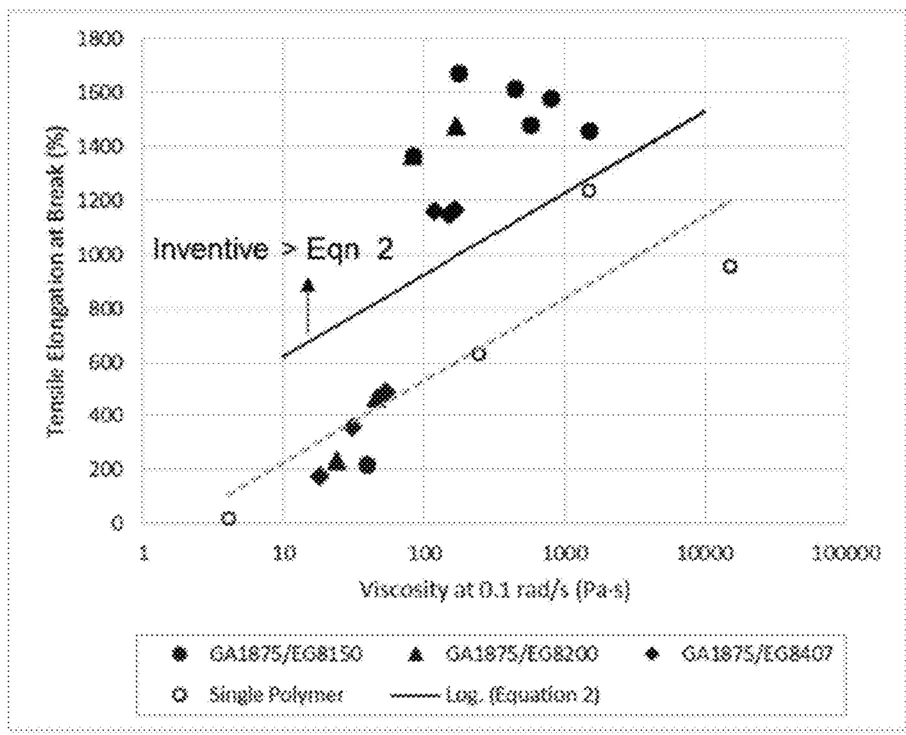
FIG. 2 depicts the Tensile Elongation at Break as a function of DMS viscosity (190° C., 10% strain, 0.1 rad/s) for inventive and comparative compositions.

As shown in Table 3 the inventive compositions have improved mechanical properties as compared to the comparative compositions. Improved Tensile Elongation at Break for the inventive compositions is also shown in FIG. 1 (100 rad/s) and FIG. 2 (0.1 rad/s).

TABLE 2

| Inventive and Comparative Polymer Compositions* | | | | | | | | | |
|---|---|---|---|---|---|---|---|---|---|
| | AFFINITY 1875 (2nd interpolymer) | ENGAGE 8150 (1st interpolymer) | ENGAGE 8407 (1st interpolymer) | ENGAGE 8200 (1st interpolymer) | B225 (AO) | Weight Ratio = y (wt of $2^{nd}$ Interpoly.)/wt. of $1^{st}$ Interpoly) | I2 Ratio = x (I2 of $2^{nd}$ Interpoly.)/I2 of $1^{st}$ Interpoly) | 1.26ln(x) − 3.90 | 1.26ln(x) − 3.91 |
| Inv. 1 | 51.9 | 48.0 | | | 0.1 | 51.9/48.0 = 1.08 | 1200/0.5 = 2400 | 5.91 | 5.90 |
| Inv. 2 | 60.9 | 39.0 | | | 0.1 | 60.9/39.0 = 1.56 | 1200/0.5 = 2400 | 5.93 | 5.90 |
| Inv. 3 | 64.9 | 35.0 | | | 0.1 | 64.9/35.0 = 1.85 | 1200/0.5 = 2400 | 5.91 | 5.90 |
| Inv. 4 | 67.9 | 32.0 | | | 0.1 | 67.9/32.0 = 2.12 | 1200/0.5 = 2400 | 5,91 | 5.90 |
| Inv. 5 | 76.9 | 23.0 | | | 0.1 | 76.9/23.0 = 3.34 | 1200/0.5 = 2400 | 5.91 | 5.90 |
| Comp. 1 | 87.9 | 12.0 | | | 0.1 | 87.9/12.0 = 7.32 | 1200/0.5 = 2400 | 5.91 | 5.90 |
| Inv. 6 | 18.9 | | 81.0 | | 0.1 | 18.9/81.0 = 0.23 | 1200/30 = 40 | 0,75 | 0.74 |
| Inv. 7 | 26.9 | | 73.0 | | 0.1 | 26.9/73.0 = 0.37 | 1200/30 = 40 | 0.75 | 0.74 |
| Inv. 8 | 30.9 | | 69.0 | | 0.1 | 30.9/69.0 = 0.45 | 1200/30 = 40 | 0.75 | 0.74 |
| Comp. 2 | 50.9 | | 49.0 | | 0.1 | 50.9/49.0 = 1.04 | 1200/30 = 40 | 0.75 | 0.74 |
| Comp. 3 | 75.9 | | 24.0 | | 0.1 | 75.9/24.0 = 3.16 | 1200/30 = 40 | 0.75 | 0.74 |
| Inv. 9 | 54.9 | | | 45.0 | 0.1 | 54.9/45.0 = 1.22 | 1200/5 = 240 | 3.01 | 3.00 |
| Inv. 10 | 66.9 | | | 33.0 | 0.1 | 66.9/33.0 = 2.03 | 1200/5 = 240 | 3.01 | 3.00 |
| Comp. 4 | 75.9 | | | 24.0 | 0.1 | 75.9/24.0 = 3.16 | 1200/5 = 240 | 3.01 | 3.00 |
| Comp. 5 | 83.9 | | | 16.0 | 0.1 | 83.9/16.0 = 5.24 | 1200/5 = 240 | 3.01 | 3.00 |
| Inv. 11 | 82.9 | 17.0 | | | 0.1 | 82.9/17.0 = 4.88 | 1200/0.5 = 2400 | 5.91 | 5.90 |
| Comp. 6 | 63.9 | | 36.0 | | 0.1 | 63.9/36.0 = 1.78 | 1200/30 = 40 | 0.75 | 0.74 |
| Comp. 7 | 100 | | | | — | — | — | | |
| Comp. 8 | | 100 | | | — | — | — | | |
| Comp. 9 | | | 100 | | — | — | — | | |
| Comp. 10 | | | | 100 | — | — | — | | |

*Each amount is a weight part.

Density of first composition ($\rho$) determined using $\rho = \frac{\rho_1 \rho_2}{\rho_1 w_2 + \rho_2 w_1}$, where $\rho_1$ and $\rho_2$ are the density of the first interpolymer and the density of the second interpolymer, respectively, and $w_1$ and $w_2$ are the weight fraction of first interpolymer and the weight fraction of the second interpolymer, respectively; and $w_1 + w_2 = 1$. Density ($\rho$) = 0.870 g/cc for each inventive first composition.

TABLE 3

Properties of Inventive and Comparative Samples

| | | DMS Viscosity | | Microtensile | | | | |
|---|---|---|---|---|---|---|---|---|
| | Percent GA1875 wt % | μ @ 190° C., 0.1 rad/s ($x_2$) Pa · s | μ @ 190° C., 100 rad/s ($x_1$) Pa · s | Tensile Elongation at Break (y) % | Tensile Strength psi | 10% modulus psi | [186.75 In($x_1$) + 70.00] Eqn. 1 psi | [131.01 In($x_2$) + 323.33] Eqn. 2 psi |
| Inv. 1 | 51.9 | 1514 | 402 | 1462 | 1256 | 93 | 1437 | 1109 |
| Inv. 2 | 60.9 | 798 | 254 | 1583 | 1047 | 90 | 1318 | 1049 |
| Inv. 3 | 64.9 | 575 | 199 | 1484 | 822 | 90 | 1257 | 1017 |
| Inv. 4 | 67.9 | 445 | 164 | 1616 | 797 | 92 | 1209 | 991 |
| Inv. 5 | 76.9 | 178 | 83 | 1674 | 508 | 92 | 1038 | 1149 |
| Comp. 1 | 87.9 | 39 | 25 | 221 | 209 | 90 | 754 | 745 |
| Inv. 6 | 18.9 | 151 | 134 | 1150 | 524 | 105 | 1007 | 962 |
| Inv. 7 | 26.9 | 120 | 104 | 1161 | 458 | 97 | 964 | 932 |
| Inv. 8 | 30.9 | 168 | 142 | 1169 | 557 | 99 | 1027 | 973 |
| Comp. 2 | 50.9 | 53 | 49 | 485 | 262 | 94 | 811 | 833 |
| Comp. 3 | 75.9 | 18 | 18 | 175 | 208 | 81 | 610 | 702 |
| Inv. 9 | 54.9 | 169 | 119 | 1477 | 645 | 96 | 1028 | 949 |
| Inv. 10 | 66.9 | 84 | 65 | 1369 | 409 | 85 | 897 | 870 |
| Comp. 4 | 75.9 | 46 | 38 | 467 | 247 | 83 | 785 | 800 |
| Comp. 5 | 83.9 | 24 | 22 | 236 | 218 | 80 | 664 | 728 |
| Inv. 11 | 82.9 | 85 | 47 | 1366 | 321 | 74 | 900 | 828 |
| Comp. 6 | 63.9 | 31 | 29 | 356 | 238 | 76 | 711 | 764 |
| Comp. 7 | 100 | 4.0 | 4.2 | 21 | 84 | 55 | 329 | 511 |
| Comp. 8 | 0 | 16083 | 2154 | 960 | 1506 | 96 | 1879 | 1329 |
| Comp. 9 | 0 | 259 | 206 | 632 | 454 | 106 | 1108 | 1021 |
| Comp. 10 | 0 | 1496 | 656 | 1239 | 1574 | 120 | 1435 | 1173 |

The invention claimed is:

1. A composition comprising at least the following:

a first composition comprising components a and b:

a) a first ethylene/alpha-olefin interpolymer comprising an I2≤100 dg/min, and a density ≤0.880 g/cc, and b) a second ethylene/alpha-olefin interpolymer comprising an I2>100 dg/min;

wherein the first composition meets the following relationship: y≤1.26ln(x)−3.90, where y=weight ratio of the second interpolymer to the first interpolymer, and x=the I2 ratio of the second interpolymer to the first interpolymer; and wherein the composition comprises ≥95 wt % of the sum of the first interpolymer and the second interpolymer, based on the weight of the composition.

2. The composition of claim 1, wherein the first composition meets the following relationship: y<1.26ln(x)−3.90.

3. The composition of claim 1, wherein the second ethylene/alpha-olefin interpolymer has a density from 0.860 g/cc to 0.880 g/cc.

4. The composition of claim 1, wherein the second interpolymer has an I2 value from 200 dg/min to 1500 dg/min.

5. The composition of claim 1, wherein the first interpolymer has an I2 value from 0.01 dg/min to 70 dg/min.

6. The composition of claim 1, wherein the I2 ratio of the second interpolymer to the first interpolymer is from 25 to 3000.

7. The composition of claim 1, wherein the weight ratio of the second interpolymer to the first interpolymer is from 0.10 to 6.00.

8. The composition of claim 1, wherein the second interpolymer has a melt viscosity (177° C.) from 3,500 cP to 28,000 cP.

9. The composition of claim 1, wherein the second interpolymer has a molecular weight distribution MWD (=Mw/Mn) from 1.80 to 3.00.

10. The composition of claim 1, wherein the first interpolymer has a molecular weight distribution MWD (=Mw/Mn) from 1.80 to 2.80.

11. The composition of claim 1, wherein the composition has a DMS viscosity (190° C., 10% strain, 0.1 rad/s) from 60 Pa·s to 5000 Pa·s.

12. The composition of claim 1, wherein the composition has a DMS viscosity (190° C., 10% strain, 100 rad/s) from 30 Pa·s to 500 Pa·s.

13. The composition of claim 1, wherein the composition meets the following relationship: $y_1(x_1)$≥186.75ln($x_1$)+70, where $y_1$=Tensile Elongation at Break, and $x_1$=Viscosity at 100 rad/s, 10% strain and 190° C.

14. The composition of claim 1, wherein the composition meets the following relationship: $y_1$ ($x_2$)≥131.01ln($x_2$)+323.33, where $y_1$=Tensile Elongation at Break, and $x_2$=Viscosity at 0.1 rad/s, 10% strain and 190° C.

15. An article comprising at least one component formed from the composition of claim 1.

16. The composition of claim 1, wherein the 12 of the second ethylene/alpha-olefin interpolymer is ≥700 dg/min.

17. An article comprising at least one component formed from a composition comprising at least the following:

a first composition comprising components a and b:

a) a first ethylene/alpha-olefin interpolymer comprising an I2≤100 dg/min, and a density ≤0.880 g/cc, and b) a second ethylene/alpha-olefin interpolymer comprising an I2 >100 dg/min;

wherein the first composition meets the following relationship: y≤1.26ln(x)−3.90, where y=weight ratio of the second interpolymer to the first interpolymer, and x=the I2 ratio of the second interpolymer to the first interpolymer; and wherein the composition comprises ≥60 wt % of the sum of the first interpolymer and the second interpolymer, based on the weight of the composition.

* * * * *